June 12, 1923.
A. W. SODERBERG
1,458,859
CONVEYING MECHANISM
Filed March 24, 1921
2 Sheets-Sheet 1
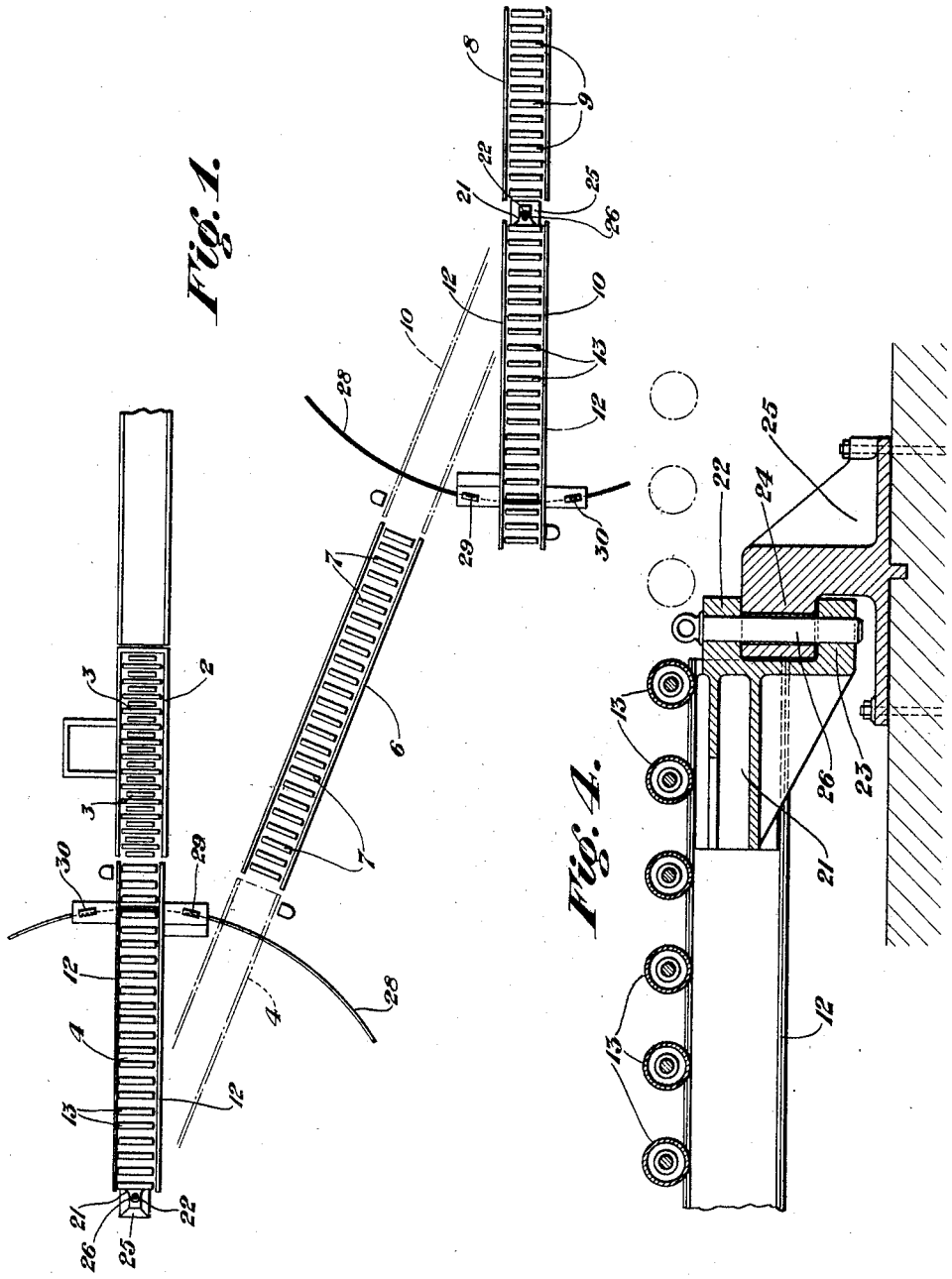
Witnesses:
Inventor:
A. W. Soderberg June 12, 1923.
A. W. SODERBERG
CONVEYING MECHANISM
Filed March 24, 1921
1,458,859
2 Sheets-Sheet 2
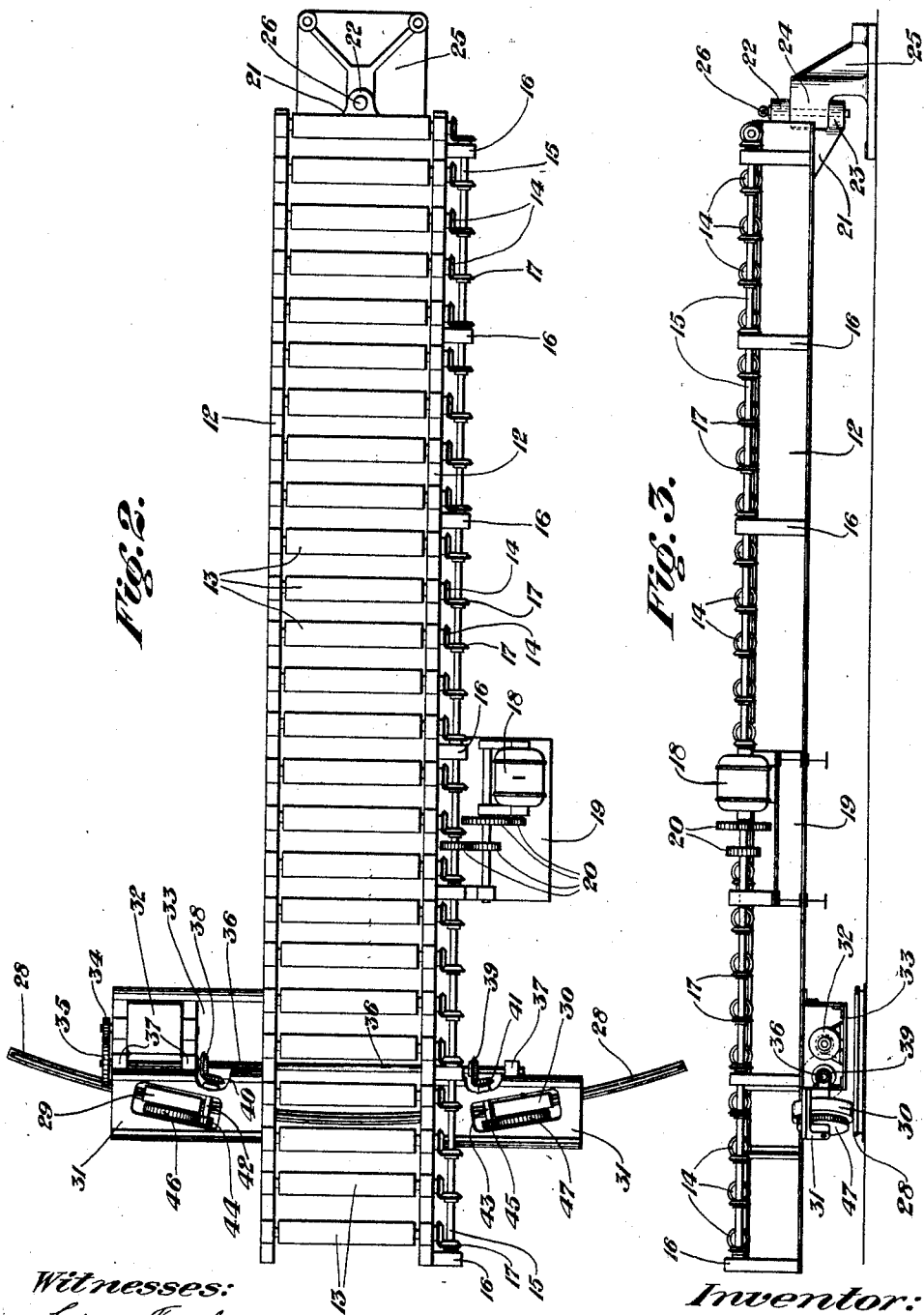
Witnesses:
Edwin Trueb
R D Little
Inventor:
A. W. SODERBERG.
by D Anthony Usina
Attorney.

Patented June 12, 1923.

1,458,859

UNITED STATES PATENT OFFICE.

ANDREW W. SODERBERG, OF MUNHALL, PENNSYLVANIA.

CONVEYING MECHANISM.

Application filed March 24, 1921. Serial No. 455,181.

*To all whom it may concern:*

Be it known that I, ANDREW W. SODERBERG, a citizen of the United States, and resident of Munhall, in the county of Allegheny and State of Pennsylvania, have invented certain new and useful Improvements in Conveying Mechanisms, of which the following is a specification.

This invention relates to conveyers for rolling mills and while not limited thereto relates particularly to conveyers for transferring metal plates around a mill from one point to another, and has for its principal object the provision of an automatic conveyer that will convey the plates from one position to another, thereby eliminating the use of castors over which the plates have heretofore been manually moved.

Another object is to provide a conveyer that will be composed of a minimum of moving parts, be of simple construction and one that will be strong and durable.

Still another object is to provide a conveyer of the novel design, and combination of parts hereinafter fully described in the following specification and illustrated in the accompanying drawings.

In the drawings, Figure 1 is a top plan of a conveyer constructed in accordance with my invention.

Figure 2 is an enlarged top plan of one of the swinging transfer tables of the conveyer.

Figure 3 is a side elevation of the table of Figure 2.

Figure 4 is a detail sectional elevation through pivot stand and rear end of the transfer table showing the pivotal connection.

Referring particularly to the drawings, the numeral 2 designates the runout table from a mill which has the usual conveying rollers 3 journaled therein. A swinging transfer table 4 having suitable conveying rollers journaled therein is pivotally mounted at a point in alinement with the central axis of the table 2 and its free end is adapted to abut the forward end of the table 2.

An intermediate fixed or stationary transfer table 6 is mounted to the one side of and at an angle to the table 2 and is provided with the usual conveying rollers 7. The table 4 is adapted to be swung into alinement with the rear end of the table 6, thus delivering material from the table 2 onto the table 6.

A third stationary table 8 having the usual conveying rollers 9 journaled therein is arranged on a line parallel with the table 2 and to the one side and beyond the forward end of the table 6 to convey the plates and other articles to a suitable point of distribution, such as a shipping floor.

A second swinging transfer table 10 having suitable conveying rollers journaled therein, is pivotally mounted at a point in alinement with the forward end of the stationary table 8 and is adapted to be swung into alinement with the forward end of the stationary table 6 thus receiving material from the table 6 and delivering it to the table 8 for distribution.

The swinging tables 4 and 10 are of identical construction, each comprising a bed or body portion 12 having conveying rollers 13 journaled in spaced relation along their length. The conveying rollers 13 each have their one end projecting beyond the body 12 of the table and have a bevel gear 14 secured thereon. A drive shaft 15 extends along the table and is journaled in suitable bearings 16. Shaft 15 is provided with beveled gears 17 in mesh with the gears 14 on the rollers 13 and is driven by a motor 18 mounted on a bracket support 19 carried by the body of the table. The motor 18 is suitably connected to the shaft 15 by gearing 20.

The rear end of each of the swinging tables is provided with an end member 21 having outwardly extending apertured spaced pivot lugs 22—23 adapted to have the overhanging apertured head 24 of the pivot stand 25 fitted therebetween and a pivot pin 26 is passed through the alined apertures in the lugs 22—23 and head 24 of the stand 25 forming a pivotal bearing for the swinging table.

The forward or free end of each of the swinging tables is adapted to be supported on a curved track rail 28 by traction wheels 29—30 journaled in a suitable transverse girder support 31 secured adjacent the end of the table and extending beyond the sides thereof.

The wheels 29—30 are set at an angle to the transverse axis of the table so as to present the greatest area of their traction face to the track rail 28.

The wheels 29—30 are each driven from a single motor 32 mounted on a bracket or shelf support 33 to the rear of the girder support 31. Motor 32 carries a pinion gear 34 which meshes with a gear 35 on the one end of a drive shaft 36 journaled in suitable bearings 37. The shaft 36 has beveled gears 38 and 39 thereon which mesh with beveled gears 40 and 41 respectively, carried by stub shafts 42 and 43 which have pinion gears 44 and 45 on their other ends. The pinion gears 44 and 45 mesh, respectively, with the driving gears 46 and 47 which are secured to or formed integral with the respective traction wheels 29—30.

The operation of this conveyer is as follows: Plates or other material to be transferred will be conveyed outwardly along the runout table 2 from the mill and onto the swinging table 4. When the plates or other material has run onto the table 4, the conveying rollers 13, thereof, are stopped by breaking the circuit to the motor 18 and the circuit to the motor 32 is made, thus driving the traction wheels 29—30 and swinging the table 4 about its pivot pin 26 until it comes into alinement with the intermediate stationary table 6 when the circuit to motor 32 will be broken and the table stopped in its movement. After the swinging table 4 is thus alined with the intermediate stationary table 6 the circuit to the motor 18 will again be made to drive the rollers 13 and convey the plate or other material forward onto the intermediate table 6. The rollers 7 of table 6 will convey the plate or other material forward onto the second swinging table 10. When the plate or other material has run onto the swinging table 10 the motor 18 will be stopped by breaking the circuit thereto, thus stopping the rollers 13. The circuit to the motor 32 will then be made, thus driving the traction wheels 29—30 to swing the table 10 about its pivot pin 26 until it comes into alinement with the stationary table 8. After the swinging table 10 has been alined with the table 8 the circuit to the motor 32 will be broken and the movement of table 10 stopped, while the circuit to the motor 18 will again be made to drive the rollers 13 and convey the plate or other material forward onto the table 8.

It will be expressly understood that while I have shown and described one specific form of my invention I do not wish to be limited thereto since various modifications will readily suggest themselves to those skilled in the art and may be made without departing from the spirit of my invention as defined in the appended claims.

I claim:—

1. In a conveyer for rolling mills a swinging transfer table comprising a body portion having conveying rollers journaled therein, said body portion having its one end pivotally mounted on a fixed pivot stand, traction wheels journaled adjacent the other end of said table adapted to support and move said table on a suitable curved track, an operating shaft geared to all of said conveying rollers, a motor carried by said table for driving said operating shaft, and a second motor for driving said traction wheels.

2. In a conveyer for rolling mills a swinging transfer table comprising a body portion having conveying rollers journaled therein, said body portion having its one end pivotally mounted on a fixed pivot stand, a transverse girder member mounted adjacent the other end of said table and extending beyond the sides thereof, traction wheels journaled in said girder beyond the sides of said table adapted to support and move said table on a suitable curved track, a power shaft geared to said wheels, and a motor carried by said table for operating said shaft.

3. A conveyer for rolling mills comprising in combination, a stationary table, a second stationary table extending at an angle thereto, a swinging transfer table adapted to aline with both of said stationary tables and to transfer material from one table to the other, a third stationary table extending parallel with said first mentioned stationary table and spaced laterally from said intermediate table, and a second swinging transfer table adapted to aline with said second and last named stationary tables to transfer material from one table to the other, said swinging transfer tables each comprising a body portion having conveying rollers journaled therein, said body portion being pivoted at one end and being provided with traction wheels adjacent the other end adapted to support and move said table on a curved track, means on said table for driving said conveying rollers, and other means on said table for driving said traction wheels.

In testimony whereof I have hereunto set my hand.

ANDREW W. SODERBERG.